(No Model.)

G. M. ANDERSSON.
CENTRIFUGAL BUTTER EXTRACTOR.

No. 520,102. Patented May 22, 1894.

Witnesses
Geo. W. Breck.
C. E. Ashley

Inventor
Gustaf M. Andersson

UNITED STATES PATENT OFFICE.

GUSTAF M. ANDERSSON, OF NEWARK, NEW JERSEY, ASSIGNOR TO THE UNITED STATES BUTTER EXTRACTOR COMPANY, OF NEW YORK, N. Y.

CENTRIFUGAL BUTTER-EXTRACTOR.

SPECIFICATION forming part of Letters Patent No. 520,102, dated May 22, 1894.

Application filed June 30, 1890. Serial No. 357,204. (No model.)

*To all whom it may concern:*

Be it known that I, GUSTAF M. ANDERSSON, a subject of the King of Sweden and Norway, and a resident of Newark, county of Essex, State of New Jersey, have invented certain new and useful Improvements in Centrifugal Butter-Extracting Apparatus, of which the following is a specification, reference being had to the accompanying drawings, which form a part hereof.

This invention relates to centrifugal apparatus to be employed in extracting butter from milk or cream.

The object of the invention is to provide an improved apparatus for dividing or separating or disturbing the cream or thick milk so as to cause the particles of butter fat to coalesce and form palpable masses of butter.

The invention consists of a new centrifugal cream disturber, and the combination therewith of a suitable centrifugal drum, and of a fluid supply duct for supplying a lubricating and temperature regulating fluid to the cream disturber.

Figure 1:
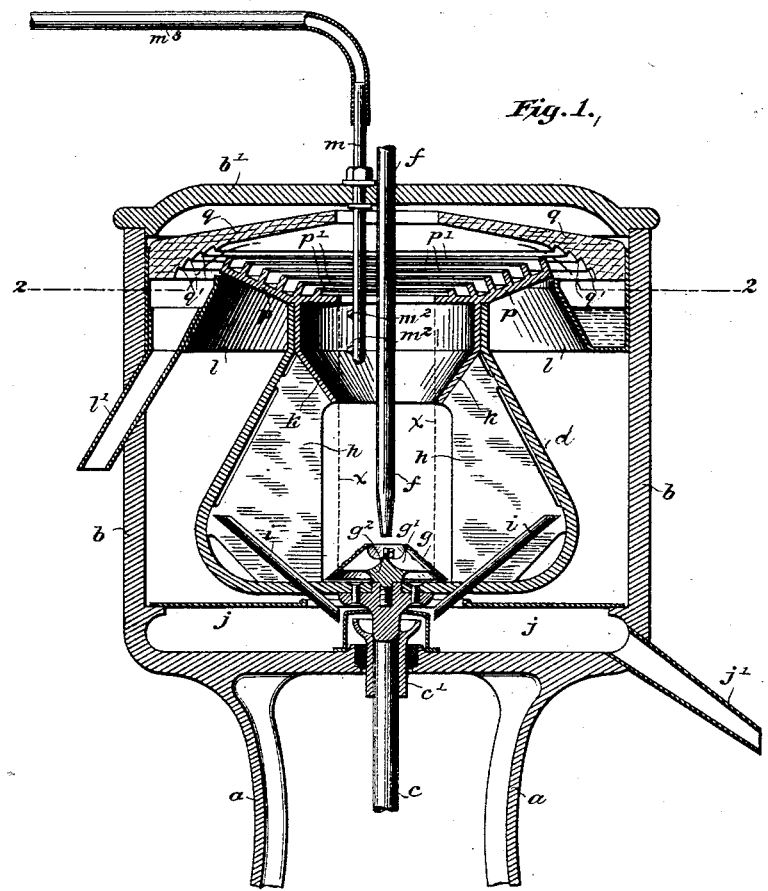
Figure 2:
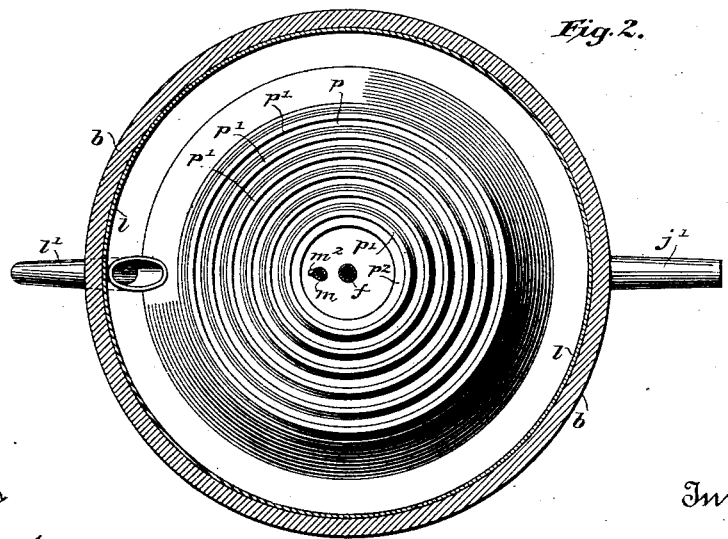

In the accompanying drawings Figure 1 is a vertical central section, and Fig. 2 is a horizontal section on the line 2—2, Fig. 1, of an apparatus embodying my invention.

The frame consists of a fixed casing $b$, provided with a removable cover $b'$, and supported by a suitable base $a$ of ordinary construction, the upper portion only of which is shown. The operating shaft $c$ is arranged vertically and rotatively mounted in bearings of the usual construction. The upper bearing $c'$ is shown in Fig. 1. Its upper part is covered by a cap secured to the casing $b$. The separating drum $d$ is securely fixed upon the upper end of the operating shaft $c$. In the operation of the machine this drum is revolved at a rate of from six thousand to eight thousand revolutions per minute.

The milk or cream is supplied preferably in a continuous but regulated stream, through the pipe $f$, which is stationary and extends downward to the lower part of the drum. A spread cup of the construction shown and claimed in my application for Letters Patent filed June 26, 1890, under Serial No. 357,307, and Patent No. 487,316 is arranged at the bottom of the drum adjacent to the mouth of the tube $f$. This spread cup comprises an inclined partition $g$, supported just above the bottom of the drum with an opening all around between the lower edge of the partition and the bottom of the drum, radial blades or ribs $g'$ for imparting rotation to the fluid passing through the spread cup, and a central spreader $g^2$. The milk or cream passes down from the mouth of the feed tube $f$ to the spreader $g^2$, and is then thrown outward and revolved by the blades $g'$ and passes under the partition $g$ and out toward the periphery of the drum $d$. Radial blades $h$ are provided in the drum $d$ to compel the liquid to partake of the revolution of the drum. The intense centrifugal force resulting from the rapid revolution of the drum causes a separation of the particles of the fluid and a rearrangement of these particles according to their specific gravities, so that the heavy blue milk is near the periphery of the drum and the light cream is nearest the center or axis. The inner periphery of the cream wall will be about in the position indicated by the dotted lines $x$. The outlet for the blue milk is provided by the two inclined tubes $i$, extending from points within the drum, near the outer wall of the drum downward and out of the drum. A receiver $j$ is formed in the bottom of the casing $b$, into which the blue milk passes from the mouths of the tubes $i$, and a spout $j'$ leads from this receiver out of the machine.

An inwardly extending inclined partition $k$, preferably formed in one piece with the top of the drum and the cream disturber mounted thereon, is arranged in the upper part of the drum concentric with the drum and having its inner edge or lip about in the circle of the inner cream wall. This partition is of the construction shown and claimed in my above mentioned application. The cream flows upward over this partition and rises upward in the drum and flows up over the inner edge of the top of the drum and into my improved centrifugal cream disturber. The portion of the drum above the partition $k$ thus forms a passage from the inner portion of the cream wall in the drum to the cream disturber.

The centrifugal cream disturber is composed of two parts, one part revolving with the drum, the other part being stationary, each part being capable of alone measurably producing the desired effect. The rotative part is arranged within the stationary part, that is to say, nearer the axis of revolution than the stationary part. The part of the cream disturber fitted to rotate is mounted upon the drum $d$. It consists of a somewhat dish-shaped plate $p$ having a floor horizontal or slightly inclined or both, as shown in the drawings, which floor is provided with a series of concentric circular walls $p'$, $p'$. These walls $p'$, $p'$ rise a short distance upward from the floor of the rotatable disturber $p$, and are arranged with their upper edges or tops in successively higher planes on lines sloping upward from the axis of revolution, that is to say, the wall nearest the center is the lowest, the next farther from the center is higher, and so on, the outer wall which is farthest from the center being the highest. The portion of the plate $p$ nearest the center, which is shown in the drawings as horizontal, constitutes the top or cover of the drum, and the plate is preferably formed in one piece with the partition $k$. The inner edge $p^2$ of the plate $p$ is circular and about on the circle of the inner cream wall of the drum. The cream flows over this edge $p^2$ and is then thrown outward from the center and strikes against the inmost wall $p'$. It flows over this wall and is then thrown outward and downward against the next wall $p'$. It is then thrown up and over this second wall $p'$ and outward and downward against the succeeding wall $p'$ and so on. From the last wall $p'$ the cream or butter is thrown outward and against the stationary part of the cream disturber. This stationary part of the cream disturber consists of a series of concentric steps $q'$, $q'$ arranged further from the axis of revolution of the drum than the walls $p'$, and they are formed on the inverted dish-shaped shield $q$. These steps $q'$ are arranged with their lower edges in successively lower planes on lines sloping downward from the axis of revolution. This shield $q$ is attached to the butter receiver $l$, fixed in the upper part of the casing $b$, and having a spout $l'$ which conveys the butter out of the machine. The inner wall of the receiver $l$ extends closely under the outer edge of the plate $p$, to insure catching all the butter. The high velocity which the butter or cream has acquired in the revolving part of the machine throws it with considerable force against the stationary ridges or steps $q'$, and it jumps from step to step and finally falls into the butter receiver $l$.

The fluid supply device consists of a duct provided with one or more nozzles arranged so as to supply a lubricating and temperature regulating fluid, such as water, brine or milk, to the cream adjacent to the cream disturber or butter uniting portion of the apparatus. This fluid supply duct consists of a pipe $m$, held in the top $b'$ of the casing, and extending downward into the drum, and provided with nozzles $m^2$, $m^2$, arranged just below the inner edge $p^2$ of the top of the drum $d$. A pipe $m^3$ connects the tube $m$ with a suitable source of fluid. The fluid passes with the cream into the cream disturber and flows over the cream disturber and into the receiver $l$. This fluid can be supplied at any desired temperature, and thus the temperature of the cream can be regulated. It also acts efficiently as a lubricant and prevents the particles and masses of butter from adhering to the ridges or steps of the cream disturber or to other portions of the apparatus.

It is obvious that parts of my invention may be separately used. The cream disturber may be used without the drum or with a drum of different construction. Again the stationary part of the cream disturber may be omitted, or the revolving part of the cream disturber may be omitted.

A fluid supply device and inwardly extending partition in the upper part of the drum are claimed in my above application and are not therefore separately claimed herein. The spread cup is also claimed in such application and is therefore not claimed herein.

The method of extracting butter carried out by the apparatus of this invention forms the subject of another application filed on even date herewith and is not claimed herein.

Having thus described my invention, what I claim, and desire to secure by Letters Patent, is—

1. In a centrifugal butter extracting apparatus, a centrifugal cream disturber consisting of a series of stationary circular ridges or steps arranged at successively increasing distances from the axis of revolution, and means for imparting rotation to the cream, substantially as set forth.

2. In a centrifugal butter extracting apparatus, a centrifugal cream disturber consisting of a series of ridges or steps arranged at successively increasing distances from the axis of revolution and composed of two parts, arranged one within the other, the outer part being stationary and the inner part fitted to rotate, and means for rotating the inner part, substantially as set forth.

3. In a centrifugal butter extracting apparatus, a centrifugal cream disturber consisting of a series of ridges or steps arranged at successively increasing distances from the axis of revolution and composed of two parts, arranged one within the other, the outer part being stationary and the inner part fitted to rotate, and means for rotating the inner part, in combination with a fluid supply duct provided with one or more nozzles and arranged adjacent to the cream disturber, substantially as set forth.

4. In a centrifugal butter extracting apparatus, the combination with the drum and means for revolving it, of a centrifugal cream disturber consisting of a series of ridges or steps arranged at successively increasing distances from the axis of revolution and composed of two parts, arranged one within the other, the outer part being stationary and the inner part fitted to rotate, and such inner part being mounted upon the drum, leading from the inner cream wall of the drum to the cream disturber, and one or more outlets for the blue milk, substantially as set forth.

5. In a centrifugal butter extracting apparatus, the combination with the drum and means for revolving it, of a centrifugal cream disturber consisting of a series of ridges or steps arranged at successively increasing distances from the axis of revolution, and composed of two parts, arranged one within the other, the outer part being stationary and the inner part fitted to rotate, and such inner part being mounted upon the drum, a fluid supply duct provided with one or more nozzles and arranged adjacent to the cream disturber, leading from the inner cream wall of the drum to the cream disturber, and one or more outlets for the blue milk, substantially as set forth.

6. In a centrifugal butter extracting apparatus, a centrifugal cream disturber consisting of a series of ridges or steps arranged at successively increasing distances from the axis of revolution and composed of two parts, arranged one within the other, the inner part being fitted to rotate, and having its ridges or steps arranged with their upper edges in successively higher planes on lines sloping upward from the axis of revolution, and the outer part being stationary and having its ridges or steps arranged with their lower edges in successively lower planes on lines sloping downward from the axis of revolution, and means for rotating the inner part, substantially as set forth.

7. In a centrifugal butter extracting apparatus, the combination with the drum and means for revolving it, of a centrifugal cream disturber consisting of a series of ridges or steps arranged at successively increasing distances from the axis of revolution and composed of two parts, arranged one within the other, the inner part being fitted to rotate and having its ridges or steps arranged with their upper edges in successively higher planes on lines sloping upward from the axis of revolution, and the outer part being stationary and having its ridges or steps arranged with their lower edges in successively lower planes on lines sloping downward from the axis of revolution, and such inner part being mounted upon the drum, leading from the inner cream wall of the drum to the cream disturber, and one or more outlets for the blue milk, substantially as set forth.

8. In a centrifugal butter extracting apparatus, the combination with the drum and means for revolving it, of a centrifugal cream disturber consisting of a series of ridges or steps arranged at successively increasing distances from the axis of revolution and composed of two parts, arranged one within the other, the inner part being fitted to rotate and having its ridges or steps arranged with their upper edges in successively higher planes on lines sloping upward from the axis of revolution, and the outer part being stationary and having its ridges or steps arranged with their lower edges in successively lower planes on lines sloping downward from the axis of revolution, and such inner part being mounted upon the drum, a fluid supply duct provided with one or more nozzles and arranged adjacent to the cream disturber, leading from the inner cream wall of the drum to the cream disturber, and one or more outlets for the blue milk, substantially as set forth.

9. In a centrifugal butter extracting apparatus, the combination with the drum and means for revolving it, of the cream disturber, composed of two parts, one within the other, the inner part being attached to the drum and consisting of the plate $p$, the inner portion of which forms the top of the drum and the series of concentric circular ridges or steps $p'$ projecting upward from the plate $p$, and the outer part being stationary and consisting of the shield $q$ and the series of ridges or steps $q'$ projecting downward from the shield $q$, substantially as set forth.

10. In a centrifugal butter extracting apparatus, the combination with the drum and means for revolving it, of the cream disturber consisting of the plate $p$, attached to the drum and the inner portion of which forms the top of the drum, and the series of concentric circular ridges or steps $p'$ projecting upward from the plate $p$, and the inwardly extending partition $k$ within the drum, and the fluid supply duct $m$, having nozzles $m'$ arranged above the partition $k$, substantially as set forth.

11. In a centrifugal butter extracting apparatus, the combination with the drum and means for revolving it, of the cream disturber, composed of two parts, one within the other, the inner part being attached to the drum and consisting of the plate $p$, the inner portion of which forms the top of the drum and the series of concentric circular ridges or steps $p'$ projecting upward from the plate $p$, and the outer part being stationary and consisting of the shield $q$ and the series of ridges or steps $q'$ projecting downward from the shield $q$, and the inwardly extending partition $k$ within the drum, and the fluid supply duct $m$, having nozzles $m'$ arranged above the partition $k$, substantially as set forth.

GUSTAF M. ANDERSSON.

Witnesses:
HENNING G. TAUBE,
HENRY D. WILLIAMS.

It is hereby certified that in Letters-Patent No. 520,102, granted May 22, 1894, upon the application of Gustaf M. Andersson, of Newark, New Jersey, for an improvement in "Centrifugal Butter-Extractors," errors appear in the printed specification requiring correction, as follows: On page 3 in lines 5, 21, 56, and 79, the words *a passage* should be inserted before the word "leading"; and that the said Letters Patent should be read with these corrections therein that the same may conform to the record of the case in the Patent Office.

Signed, countersigned, and sealed this 29th day of May, A. D. 1894.

[SEAL.]

JNO. M. REYNOLDS,
*Assistant Secretary of the Interior.*

Countersigned:
    JOHN S. SEYMOUR,
        *Commissioner of Patents.*